US012746535B2

(12) United States Patent
Cooper et al.

(10) Patent No.: US 12,746,535 B2
(45) Date of Patent: Sep. 29, 2026

(54) METHOD OF PREPARING A HYDROCRACKING CATALYST

(71) Applicant: SHELL USA, INC., Houston, TX (US)

(72) Inventors: David Allen Cooper, Malvern, PA (US); Johan Peter Den Breejen, Amsterdam (NL); James Hughes, Malvern, PA (US); Cornelis Ouwehand, Amsterdam (NL); Marcello Stefano Rigutto, Amsterdam (NL)

(73) Assignee: SHELL USA, INC., Houston, TX (US)

( * ) Notice: Subject to any disclaimer, the term of this patent is extended or adjusted under 35 U.S.C. 154(b) by 355 days.

(21) Appl. No.: 17/912,905

(22) PCT Filed: Mar. 15, 2021

(86) PCT No.: PCT/EP2021/056455
§ 371 (c)(1),
(2) Date: Sep. 20, 2022

(87) PCT Pub. No.: WO2021/185721
PCT Pub. Date: Sep. 23, 2021

(65) Prior Publication Data

US 2023/0191375 A1 Jun. 22, 2023

(30) Foreign Application Priority Data

Mar. 20, 2020 (EP) .................................... 20164401

(51) Int. Cl.
*B01J 23/888* (2006.01)
*B01J 21/12* (2006.01)
(Continued)

(52) U.S. Cl.
CPC ............. *B01J 29/166* (2013.01); *B01J 21/12* (2013.01); *B01J 23/888* (2013.01); *B01J 35/45* (2024.01);
(Continued)

(58) Field of Classification Search
CPC .... B01J 23/888; B01J 29/166; B01J 37/0018; B01J 37/0207
See application file for complete search history.

(56) References Cited

U.S. PATENT DOCUMENTS 9,126,183 B2 9/2015 Van Donk et al.
9,199,228 B2 12/2015 Domokos et al.
(Continued)

FOREIGN PATENT DOCUMENTS

CN 103769197 A 5/2014
CN 106890675 A * 6/2017 .............. B01J 31/26
WO WO-2007103027 A1 * 9/2007 .............. B01J 21/04

OTHER PUBLICATIONS

Machine translation of Gao et al. ( CN106890675), publication date Jun. 27, 2017.*
(Continued)

*Primary Examiner* — Jun L
(74) *Attorney, Agent, or Firm* — SHELL USA, INC.

(57) ABSTRACT

The present invention provides a method of preparing a supported catalyst, preferably a hydrocracking catalyst, the method at least comprising the steps of: a) providing a zeolite Y having a bulk silica to alumina ratio (SAR) of at least 10; b) mixing the zeolite Y provided in step a) with a base, water and a surfactant, thereby obtaining a slurry of the zeolite Y; c) reducing the water content of the slurry obtained in step b) thereby obtaining solids with reduced water content, wherein the reducing of the water content in step c) involves the addition of a binder; d) shaping the solids with reduced water content obtained in step c) thereby obtaining a shaped catalyst carrier; e) calcining the shaped catalyst carrier obtained in step d) at a temperature above 300° C. in the presence of the surfactant of step b), thereby obtaining a calcined catalyst carrier; f) impregnating the catalyst carrier calcined in step e) with a hydrogenation
(Continued)

component thereby obtaining a supported catalyst; wherein no heat treatment at a temperature of above 500° C. takes place between the mixing of step b) and the shaping of step d).

7 Claims, 2 Drawing Sheets

(51) Int. Cl.

| | |
|---|---|
| ***B01J 29/16*** | (2006.01) |
| ***B01J 35/10*** | (2006.01) |
| ***B01J 35/45*** | (2024.01) |
| ***B01J 35/63*** | (2024.01) |
| ***B01J 35/64*** | (2024.01) |
| ***B01J 35/70*** | (2024.01) |
| ***B01J 35/77*** | (2024.01) |
| ***B01J 37/00*** | (2006.01) |
| ***B01J 37/02*** | (2006.01) |
| ***B01J 37/04*** | (2006.01) |
| ***B01J 37/08*** | (2006.01) |
| ***C10G 47/20*** | (2006.01) |

(52) U.S. Cl.

CPC ........... *B01J 35/633* (2024.01); *B01J 35/635* (2024.01); *B01J 35/647* (2024.01); *B01J 35/70* (2024.01); *B01J 35/77* (2024.01); *B01J 37/0018* (2013.01); *B01J 37/0207* (2013.01); *B01J 37/04* (2013.01); *B01J 37/088* (2013.01); *C10G 47/20* (2013.01); *B01J 2235/00* (2024.01); *B01J 2235/15* (2024.01); *C10G 2300/202* (2013.01); *C10G 2300/301* (2013.01); *C10G 2300/308* (2013.01)

(56) References Cited

U.S. PATENT DOCUMENTS

| | | | | |
|---|---|---|---|---|
| 2007/0227351 | A1 | 10/2007 | Garcia-martinez | |
| 2007/0244347 | A1* | 10/2007 | Ying | B01J 29/18 210/600 |
| 2007/0272593 | A1* | 11/2007 | Stockwell | B01J 29/064 208/111.1 |
| 2012/0055846 | A1* | 3/2012 | Domokos | C10G 47/20 502/67 |
| 2013/0292300 | A1 | 11/2013 | Ying et al. | |

OTHER PUBLICATIONS

International Search Report and Written Opinion received for PCT Patent Application No. PCT/EP2021/056455, mailed on May 11, 2021, 13 pages.

Brunauer et al., “Adsorption of Gases in Multimolecular Layers”, Journal of the American Chemical Society, Feb. 1, 1938, vol. 60, Issue No. 2, pp. 309-319.

Garcia-Martinez et al., “Evidence of Intracrystalline Mesostructured Porosity in Zeolites by Advanced Gas Sorption, Electron Tomography and Rotation Electron Diffraction”, Chemcatchem, Aug. 8, 2014, vol. 6, pp. 3110-3115.

Poduval et al., “Brønsted Acid Sites of Zeolitic Strength in Amorphous Silica-alumina”, Schuit Institute of Catalysis, Apr. 21, 2010, vol. 46, pp. 3466-3468.

Maxwell et al., “Chapter 15, Hydrocarbon Processing With Zeolites”, Studies in Surface Science and Catalysis, 1991, vol. 58, pp. 571-630.

Office Action Received for Chinese Application No. 202180022509.4, Mailed on Apr. 14, 2023, 21 Pages (12 Pages of English Translation and 9 Pages of Official Copy).

Office Action Received for Singapore Application No. 11202252834Q, Mailed on Dec. 13, 2024, 07 Pages (07 Pages of Official Copy).

* cited by examiner

METHOD OF PREPARING A HYDROCRACKING CATALYST

CROSS REFERENCE TO RELATED APPLICATIONS

This is a National stage application of International Application No. PCT/EP2021/056455, filed Mar. 15, 2021, which benefits from the priority of EP Application Serial No. 20164401.0, filed Mar. 20, 2020, which is hereby incorporated by reference in its entirety.

FIELD OF INVENTION

The present invention relates to a method of preparing a supported catalyst, preferably a hydrocracking catalyst.

BACKGROUND OF THE INVENTION

Various methods of preparing supported catalysts are known in the art.

As an example, CN103769197A discloses a method for preparing a sulfurized hydrocracking catalyst.

As a further example, US20130292300A1 discloses mesostructured zeolites, methods for preparing catalyst compositions from such mesostructured zeolites and the use of such catalyst compositions in hydrocracking processes. According to Examples 7&8 of US20130292300A1 (which describe small scale experiments), a zeolite material was mixed with deionized water and CTAB (an alkylammonium halide surfactant) and subsequently concentrated ammonium hydroxide ($NH_4OH$) was added. After stirring for 24 hours at room temperature, the solid was separated via vacuum filtration and washed 3 times with hot deionized water. The solid was then dried and subsequently calcined in a two-step calcination, first at 550° C. (under nitrogen) and then 600° C. (under air). This calcined material was subsequently (cf. Example 8 US20130292300A1) combined with a binder material, impregnated with nickel oxide (NiO) and molybdenum trioxide ($MoO_3$) to form several different hydrocracking catalysts.

A problem of catalyst preparation methods as described in the above US20130292300A1 wherein a surfactant is present in the zeolite material during air calcination, is that, when scaling up the catalyst preparation process to commercial scale, the air calcination may suffer from explosibility risks in view of the presence of the surfactant, e.g. due to its carbon content. Also, calcination under an inert gas such as nitrogen at commercial scale is CAPEX intensive.

It is an object of the present invention to overcome or minimize one or more of the above or other problems.

It is a further object of the present invention to provide an alternative method for preparing a supported catalyst, in particular for use as a hydrocracking catalyst.

SUMMARY OF THE INVENTION

One or more of the above or other objects can be achieved by providing a method of preparing a supported catalyst, preferably a hydrocracking catalyst, the method at least comprising the steps of:

a) providing a zeolite Y having a bulk silica to alumina ratio (SAR) of at least 10;

b) mixing the zeolite Y provided in step a) with a base, water and a surfactant, thereby obtaining a slurry of the zeolite Y;

c) reducing the water content of the slurry obtained in step b) thereby obtaining solids with reduced water content, wherein the reducing of the water content in step c) involves the addition of a binder;

d) shaping the solids with reduced water content obtained in step c) thereby obtaining a shaped catalyst carrier;

e) calcining the shaped catalyst carrier obtained in step d) at a temperature above 300° C. in the presence of the surfactant of step b), thereby obtaining a calcined catalyst carrier;

f) impregnating the catalyst carrier calcined in step e) with a hydrogenation component thereby obtaining a supported catalyst;

wherein no heat treatment at a temperature of above 500° C. takes place between the mixing of step b) and the shaping of step d).

DETAILED DESCRIPTION OF THE INVENTION

Figure 1:
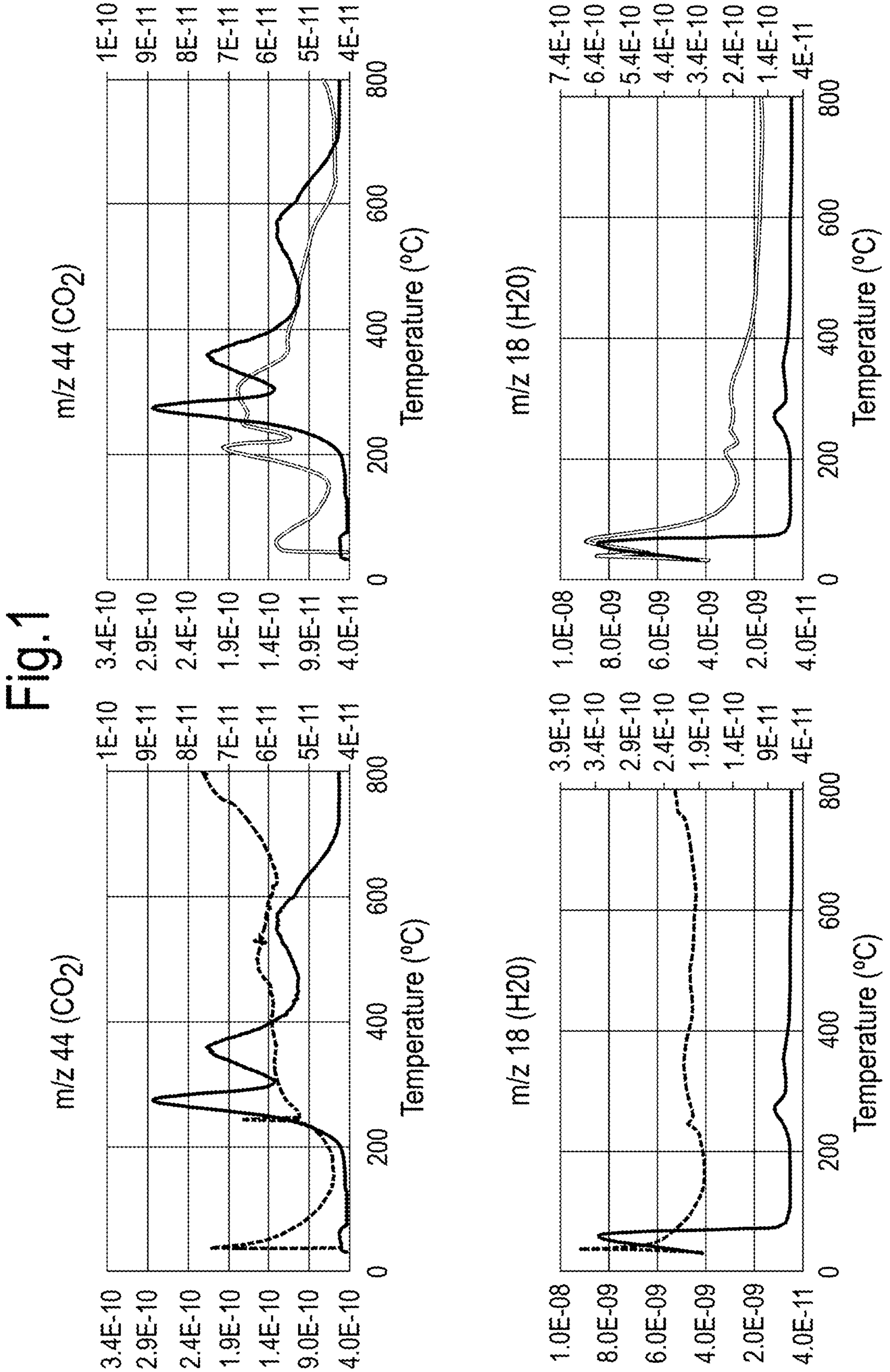
FIG. 1 (part one) and FIG. 2 (part two) show thermogravimetric analysis-mass spectrometry (TGA-MS) measurements for the examples herein.
Figure 2:
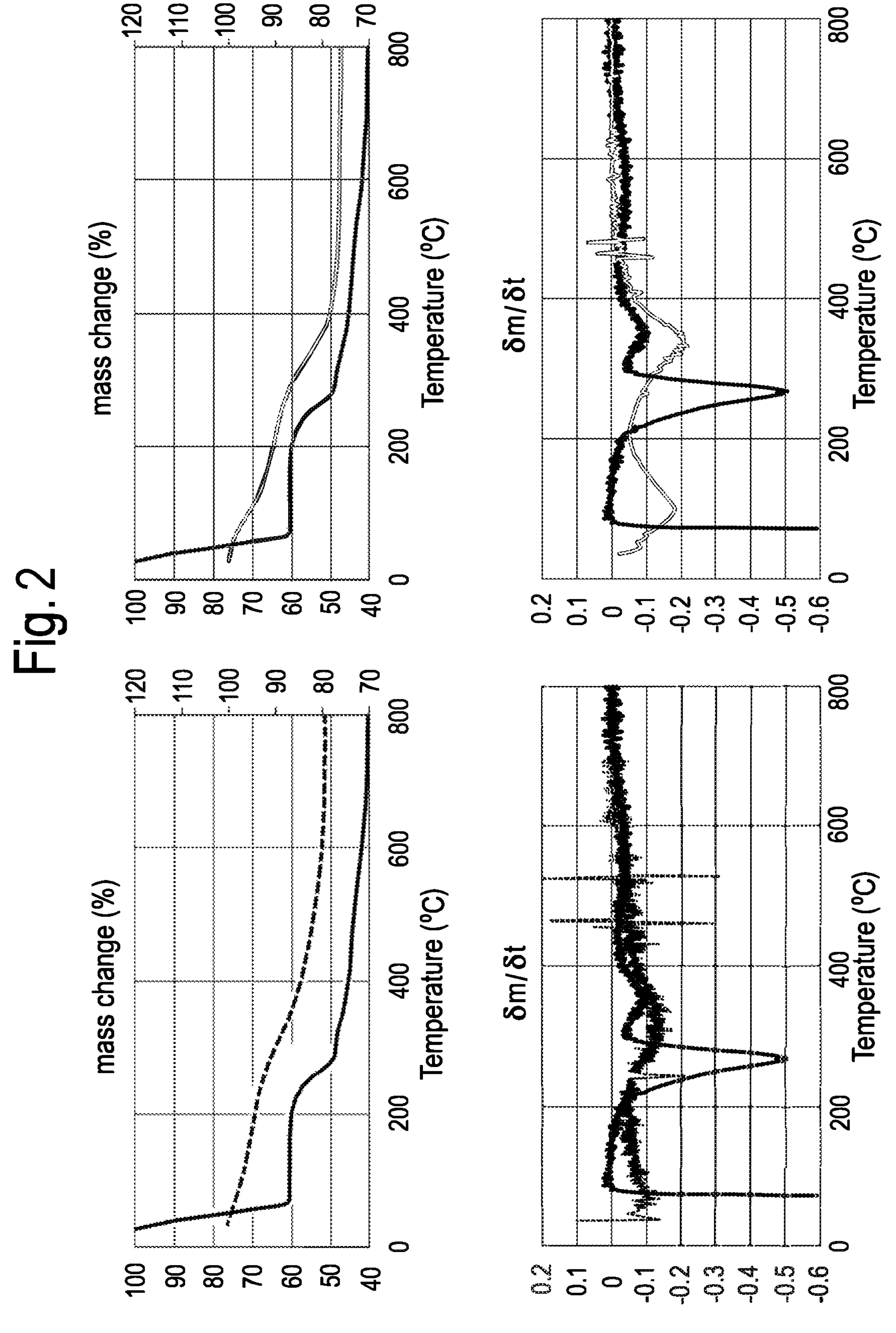

It has now surprisingly been found according to the present invention that (see e.g. Table 3) the explosion risk during air calcination is significantly reduced or even fully removed and hereby the ease of manufacturing increased (as the use of an inert gas such as nitrogen during calcination is removed). Also, the calcination can take place in one step resulting in a process simplification.

Another advantage of the present invention is that the supported catalyst as prepared by the method according to the present invention provides for a higher middle distillate (MD) selectivity (150° C.-370° C.) when used in the hydroconversion of a hydrocarbonaceous feedstock.

In step a) of the method according to the present invention, a zeolite Y having a bulk (molar) silica to alumina ratio (SAR) of at least 10 (as determined by XRF (X-ray fluorescence)) is provided.

The person skilled in the art will readily understand that this zeolite Y (which has a faujasite structure) can vary widely. Also, it would be possible to combine the zeolite Y with a different zeolite (e.g. zeolite beta). However, the amount of zeolite Y used according to the present invention preferably makes up at least 70 wt. % of the total amount of zeolite, more preferably at least 75 wt. %, even more preferably at least 90 wt. % or even at least 95 wt. % and even at least 98 wt. %.

Typically, the zeolite Y as used in step a) according to the present invention has a unit cell size in the range of from 24.20 to 24.50 Å. The unit cell size for a faujasite zeolite is a common property and is assessable to an accuracy of ±0.01 Å by various standard techniques. The most common measurement technique is by X-ray diffraction (XRD) following the method of ASTM D3942-80.

Further, the zeolite Y typically has a surface area of at least 700 $m^2/g$ (as measured by the well-known BET adsorption method of ASTM D4365-95, whilst using argon instead of nitrogen and with argon adsorption at a p/p0 value of 0.03), preferably at least 750 $m^2/g$ and typically below 1050 $m^2/g$.

Also, the zeolite Y typically has a crystallinity of at least 50% (for example as determined according to X-ray diffraction (XRD) utilizing ASTM D3906-97, whilst taking as standard a commercial zeolite Y of the same unit cell size).

Furthermore, the zeolite Y typically has an alkali level of at most 0.5 wt. %, preferably at most 0.2 wt. %, more preferably at most 0.1 wt. % (as determined according to XRF).

Further, the zeolite Y typically has a total pore volume of at least 0.4 ml/g (as determined by single-point Argon desorption measurements at P/P0=0.99).

As mentioned above, the zeolite Y provided in step a) has a bulk (molar) silica to alumina ratio (SAR) of at least 10 (for example as determined by XRF); typically, the zeolite Y has a SAR of below 200. Preferably, the zeolite Y provided in step a) has a bulk silica to alumina ratio (SAR) of 20 to 100. More preferably, the zeolite Y provided in step a) has a SAR of above 40, even more preferably above 60.

In step b) of the method according to the present invention, the zeolite Y provided in step a) is mixed with a base, water and a surfactant, thereby obtaining a slurry of the zeolite Y.

This step b) is intended to increase the mesoporosity of the zeolite Y of in step a). According to IUPAC nomenclature, a mesoporous material is a material containing pores with diameters between 2 and 50 nm; however, as the increase of the mesoporosity of the zeolite Y occurs in particular in the pores between 2-8 nm, the present invention also specifically focusses on this pore range. As the person skilled in the art is familiar with increasing mesoporosity of zeolites, this is not discussed here in detail; a general description of increasing mesoporosity is discussed in for example US20070227351A1 and the above-mentioned US20130292300A1. The person skilled in the art will also understand that in obtaining the slurry of the zeolite Y in step b), the sequence of the adding of water, base, surfactant and zeolite Y may be varied. As a mere example, the zeolite Y may be added to a pre-prepared aqueous basic solution of surfactant, or the base may be added after the zeolite Y has first been added to an aqueous solution of surfactant.

The person skilled in the art will readily understand that the base as used in step b) may vary widely. Suitable bases to be used are for example alkali hydroxides, alkaline earth hydroxides, $NH_4OH$ and tetraalkylammonium hydroxides.

Furthermore, the person skilled in the art will also readily understand that the surfactant may vary widely and may include a cationic, ionic or neutral surfactant. Preferably, the surfactant is a cationic surfactant. Further, it is preferred that the surfactant comprises a quaternary ammonium salt. Especially suitable surfactants are quaternary ammonium salts having 8-25 carbon atoms.

In a preferred embodiment of the method according to the present invention, the surfactant as used in step b) comprises an alkylammonium halide. Preferably, the alkylammonium halide contains at least 8 carbon atoms and typically below 25 carbon atoms. Preferably, the surfactant is selected from CTAC (cetyltrimethylammonium chloride) and CTAB (cetyltrimethylammonium bromide), and is preferably CTAC.

If desired, the aqueous solution may also contain a 'swelling agent', i.e. a compound that is capable of swelling micelles. Such a swelling agent may vary widely and may suitably be selected from the group consisting of: i) aromatic hydrocarbons and amines having from 5 to 20 carbon atoms, and halogen- and $C_{1-14}$ alkyl-substituted derivatives thereof (a preferred example being mesitylene); ii) cyclic aliphatic hydrocarbons having from 5 to 20 carbon atoms, and halogen- and $C_{1-14}$ alkyl-substituted derivatives thereof; iii) polycyclic aliphatic hydrocarbons having from 6 to 20 carbon atoms, and halogen- and $C_{1-14}$ alkyl-substituted derivatives thereof; iv) straight and branched aliphatic hydrocarbons having from 3 to 16 carbon atoms, and halogen- and $C_{1-14}$ alkyl-substituted derivatives thereof; v) alcohols, and derivatives thereof, preferably a $C_8$-$C_{20}$ alcohol, more preferably a $C_{10}$-$C_{18}$ alcohol and derivatives thereof; and vi) combinations thereof. According to an especially preferred embodiment of the present invention, in step b) the zeolite Y is mixed with a $C_8$-$C_{20}$ alcohol, preferably a $C_{10}$-$C_{18}$ alcohol.

The person skilled in the art will understand that the mixing conditions and time duration in step b) are not particularly limited and may vary widely. Typically, the mixing takes places at temperatures of from room temperature to 200° C. and pressures of 0.5 to 5.0 bara, preferably atmospheric pressure. The time duration of the mixing is typically in the range of from 30 minutes to 10 hours. The pH of the obtained slurry is typically in the range of 9.0-12.0, preferably above 10.0 and preferably below 11.0.

According to an especially preferred embodiment of the method according to the present invention, the zeolite Y in the slurry as obtained in step b) has a total mesopore volume in pores with a volume of 2-8 nm as determined according to the desorption method according to the adsorption method according to Argon-NLDFT of at least 0.2 ml/g, preferably in the range of 0.30-0.65 ml/g. Further, the zeolite Y in the slurry as obtained in step b) has a ratio of total mesopore volume in pores with a volume of 2-8 nm/total pore volume (as determined by single-point Argon desorption at P/P0=0.99) of typically 0.55-0.85 (55-85%) and preferably below 0.70 (70%).

In step c) of the method according to the present invention, the water content of the slurry obtained in step b) is reduced thereby obtaining solids with reduced water content, wherein the reducing of the water content in step c) involves the addition of a binder, preferably in an amount of from 70 to 95 wt. %, on a dry weight basis and based on the combined weight of binder and zeolite, preferably from 75 to 95 wt. %.

The person skilled in the art will readily understand that this water reduction step is not particularly limited, provided that the reducing of the water content in step c) involves the addition of a binder. In addition to the addition of a binder, this water reduction step may also include drying and filtration or a combination thereof.

It has been surprisingly found according to the present invention that by adding a binder at the time of water reduction step, the obtained solids are less sticky and hence easier to transport and handle, and also result in a more homogeneous dispersion of the binder material.

Although the binder is not particularly limited, the binder preferably comprises (and preferably even consists of) one or more non-zeolitic inorganic oxides. Preferably, the non-zeolitic inorganic oxide(s) make up more than 90 wt. % of the binder, more preferably more than 95 wt. % and even more preferably more than 98 wt. %. Exemplary non-zeolitic inorganic oxides are alumina, silica, silica-alumina, zirconia, clays, aluminium phosphate, magnesia, titania, silica-zirconia, silica-boria. Preferably, the binder comprises a component selected from the group consisting of silica-alumina and amorphous silica-alumina.

Preferably, the binder has an acidity of less than 100 micromole/gram as determined with IR (H/D exchange at 323 K through $C_6D_6$ as described in Chem. Commun., 2010, 46, 3466-3468).

According to the present invention, the binder is preferably added in an amount of from 70 to 95 wt. %, on dry weight basis and based on the combined weight of (non-zeolitic) binder and zeolite, more preferably from 75 to 95 wt. %.

If desired, there may be (optional) washing steps between the mixing of step b) and the reduction of the water content of step c), e.g. in order to remove halide and/or alkali ions.

Typically, the solids with reduced water content as obtained in step c) have a LOI (Loss on Ignition) of from 35 to 70% as determined using an Arizona Computrac Max 5000XL moisture analyser at 485° C., preferably below 50%, more preferably below 40%. In the event a (non-zeolitic) binder is used in step c), the LOI will typically be in the range of from 20 to 35% (again as determined using an Arizona Computrac Max 5000XL moisture analyser at 485° C.), preferably below 30% and more preferably below 25%, such that a free-flowing powder is obtained.

In step d) of the method according to the present invention, the solids with reduced water content obtained in step c) are shaped thereby obtaining a shaped catalyst carrier.

As the person skilled in the art is familiar with the shaping of a catalyst carrier, this is not discussed here in detail. Typically, the shaping is done by extrusion using an extruder to thereby obtain the desired shapes (e.g. cylindrical or trilobal).

Preferably, the surfactant content-expressed as carbon content of the modified zeolite and determined according to ASTM D5291—at the time of shaping in step d) is at least 20 wt. % on dry-zeolite basis, preferably at least 25 wt. %.

In step e) of the method according to the present invention, the shaped catalyst carrier obtained in step d) is calcined at a temperature above 300° C. in the presence of the surfactant of step b), thereby obtaining a calcined catalyst carrier. Preferably, the surfactant content-again expressed as carbon content of the modified zeolite and determined according to ASTM D5291—at the time of calcining in step e) is at least 20 wt. % on dry-zeolite basis.

As the person skilled in the art is familiar with the calcination conditions of a shaped catalyst carrier, this is not discussed here in detail. Preferably, the calcination in step e) takes place at a temperature above 500° C., more preferably above 600° C., typically below 1000° C., preferably below 900° C., more preferably below 850° C. Typical calcination periods are from 30 minutes to 10 hours. Typical calcination pressures are from 0.5 to 5.0 bara, preferably at atmospheric pressures.

Further, as the explosion risk during air calcination has been minimized, the calcining in step e) may take places in the presence of oxygen (or more typically: air). Herewith the ease of processing is increasing as no nitrogen blanket or the like is required. Also, it is preferred that the calcination is performed in one step.

In step f) of the method according to the present invention, the catalyst carrier calcined in step e) is impregnated with a hydrogenation component (usually a metal salt such as a metal oxide or a metal sulfide) thereby obtaining a supported catalyst.

Again, as the person skilled in the art is familiar with the impregnating of a catalyst carrier with a hydrogenation component (which typically includes a calcination step as well), this is not discussed here in detail.

Preferably, the hydrogenation component comprises a metal selected from the group consisting of Group VIB and Group VIII metals. In this respect reference is made to the Periodic Table of Elements which appears on the inside cover of the CRC Handbook of Chemistry and Physics ('The Rubber Handbook'), 66th edition and using the CAS version notation. Examples of Group VIB metals are molybdenum and tungsten and examples of Group VIII metals are cobalt, nickel, iridium, platinum and palladium. According to a particularly preferred embodiment of the present invention, the metal is selected from Ni, W and Mo, preferably Ni and W. Preferably, the eventual supported catalyst contains at least two hydrogenation components, e.g. a molybdenum and/or tungsten component in combination with a cobalt and/or nickel component. Particularly preferred combinations are a nickel component/a tungsten component and a nickel component/a molybdenum component.

The obtained supported catalyst may contain up to 50 parts by weight of hydrogenation component, calculated as metal oxide per 100 parts by weight (dry weight) of total catalyst composition.

An important feature of the present invention is that no heat treatment at a temperature of above 500° C. takes place between the mixing of step b) and the shaping of step d). Hereby, the surfactant is not removed as would be the case if calcination would take place between the mixing of step b) and the shaping of step d).

Preferably, no heat treatment at a temperature of above 300° C. takes place between the mixing of step b) and the shaping of step d); preferably, no heat treatment at a temperature of above 250° C. takes place between the mixing of step b) and the shaping of step d); even more preferably, no heat treatment at a temperature of above 200° C. takes place between the mixing of step b) and the shaping of step d).

In a further aspect, the present invention provides a supported catalyst obtained by the method according to any of the preceding claims.

In an even further aspect, the present invention provides a process for the conversion of a hydrocarbonaceous feedstock into lower boiling materials, which process comprises contacting the feedstock with hydrogen at elevated temperature and pressure in the presence of a catalyst as obtained in the method according to the present invention.

As the person skilled in the art is familiar with the process for the conversion of a hydrocarbonaceous feedstock into lower boiling materials, this is not discussed here in detail. Examples of such processes comprise single-stage hydrocracking, two-stage hydrocracking and series-flow hydrocracking as defined on page 602 and 603 of Chapter 15 (entitled "Hydrocarbon processing with zeolites") of "Introduction to zeolite science and practice" edited by Van Bekkum, Flanigen, Jansen; published by Elsevier in 1991.

Typically, the contacting takes places at (elevated) temperatures of 250 to 450° C. and a pressure of $3\times10^6$ to $3\times10^7$ Pa. A space velocity in the range from 0.1 to 10 kg feedstock per litre catalyst per hour ($kg\cdot l^{-1}\cdot h^{-1}$) is conveniently used. The ratio of hydrogen gas to feedstock (total gas rate) used is typically in the range from 100 to 5000 Nl/kg.

The hydrocarbonaceous feedstocks useful in the present process can vary within a wide boiling range and include atmospheric gas oils, coker gas oils, vacuum gas oils, deasphalted oils, waxes obtained from a Fischer-Tropsch synthesis process, long and short residues, catalytically cracked cycle oils, thermally or catalytically cracked gas oils, syncrudes, etc. and combinations thereof. The feedstock will generally comprise hydrocarbons having a boiling point of at least 330° C.

Hereinafter the invention will be further illustrated by the following non-limiting examples.

EXAMPLES

Zeolite Modifications

The following commercially available zeolite Y materials were obtained from Zeolyst International B. V (Delfzijl, The Netherlands): CBV-720, CBV-760 and CBV-780. The properties of these zeolite Y materials are given in Table 1 below.

TABLE 1

Properties of zeolite Y materials (as taken from supplier's website)

| | $SiO_2/Al_2O_3$ mole ratio (SAR) | Nominal cation form | $Na_2O$ [wt. %] | Unit cell size [Å] | Surface Area [$m^2/g$] |
|---|---|---|---|---|---|
| CBV-720 | 30 | Hydrogen | 0.03 | 24.28 | 780 |
| CBV-760 | 60 | Hydrogen | 0.03 | 24.24 | 720 |
| CBV-780 | 80 | hydrogen | 0.03 | 24.24 | 780 |

Modified Zeolite 1 (in Line with the Present Invention)

An aqueous basic solution (187.5 ml) was prepared using 2.82 g NaOH (commercially available from VWR Chemicals (Leuven, Belgium)) and 60 g CTAC (25% solution in water; commercially available from Sigma-Aldrich (Darmstadt, Germany). To this solution 30 g CBV-720 zeolite (on a dry weight basis) was added and the obtained slurry was magnetically stirred for 5 minutes.

Subsequently, the slurry was heated to 80° C. and stirred for 6 hours. Thereafter, the slurry was quenched with cold (about 20° C.) demi-water and subsequently filtered and washed thoroughly with demi-water.

The obtained mesoporous zeolite is hereinafter referred to with 'MZ1' or '720 mp'.

Modified Zeolite 2 (in Line with the Present Invention)

An aqueous solution of 72 g CTAC (25% solution; Sigma-Aldrich (Darmstadt, Germany)) and 232 g water was made. To this solution, 30 g CBV-760 zeolite (on a dry weight basis) was added and the obtained slurry was heated to 80° C. under magnetic stirring. After 1 hour at 80° C., 4.8 g NaOH (50% solution in demi-water, prepared with NaOH pellets (from VWR Chemicals (Leuven, Belgium)) was added and the slurry was stirred for 5 hours at 80° C. Then, the slurry was quenched with cold (about 20° C.) demi-water and subsequently filtered and washed thoroughly with demi-water. The filtrate was resuspended in 300 g demi-water and heated to 70° C. under magnetic stirring. After reaching 70° C., 4.6 g 65% $HNO_3$ (commercially available from Merck KGAA (Darmstad, Germany)) was added. After 1 hour at 70° C., the slurry was filtered and washed thoroughly with demi-water. The obtained mesoporous zeolite Y is hereinafter referred to with 'MZ2' or '760 mp'.

Modified Zeolite 3 (Comparative)

Half of the 760 mp was dried at 120° C., calcined at 760° C. for 1 hour in an $N_2$ atmosphere and subsequently calcined under air at 550° C. for 2 hours. This calcined sample is referred to with 'MZ3' or '760 mp-C' and serves as a comparative material (prepared using a two-step calcination procedure similar to Example 7 of US2013/0292300A1).

Modified Zeolite 4 (in Line with the Present Invention)

An aqueous solution of 72 g CTAC (25% solution in water; Sigma-Aldrich) and 232 g water was made, to which cetyl alcohol ('CA'; synthesis grade, commercially available from Sigma Aldrich (Zwijndrecht, The Netherlands)) was added as swelling agent in a CA/CTAC molar ratio of 0.4. To this solution 30 g CBV-760 zeolite (on a dry weight basis) was added, and the slurry was heated up to 80° C. while being magnetically stirred. After one hour at 80° C., 4.8 g NaOH (50% solution in demi-water, prepared with NaOH pellets (VWR Chemicals)) was added and the slurry was stirred for 5 hours at 80° C. Thereafter, the hot slurry was quenched with cold (about 20° C.) demi-water, and filtered and washed thoroughly with demi-water. The filtrate was resuspended in 300 g demi-water and heated to 70° C. while being magnetically stirred. After reaching 70° C., 0.1 gram $HNO_3$ (commercially available in 65% solution from Merck KGAA (Darmstad, Germany)) was added per gram zeolite (total of 4.6 g 65% $HNO_3$). After one hour at 70° C., the slurry was filtered and washed thoroughly with demi-water. The as-obtained modified zeolite Y is referred to with 'MZ4' or '760 mpSA' (i.e. treated with a swelling agent).

Modified Zeolite 5 (Comparative)

Half of the 'MZ4' (760 mpSA) was dried at 120° C. and subsequently calcined at 760° C. for 1 hour under $N_2$ atmosphere and subsequently calcined under air at 550° C. for 2 hours. This calcined sample is referred to with 'MZ5' or '760 mpSA-C' and serves as a comparative material (prepared using a two-step calcination procedure similar to Example 7 of US2013/0292300A1).

Modified Zeolite 6 (in Line with the Present Invention)

An aqueous solution of 24 g CTAC (25% solution in water; Sigma-Aldrich) and 77.3 g demi-water was made. To this solution 10 g CBV-780 zeolite (on a dry weight basis) was added, and the obtained slurry was heated to 80° C. while being magnetically stirred. After one hour at 80° C., 4.8 g NaOH (50% solution in demi-water, prepared with NaOH pellets (VWR Chemicals)) was added and the slurry was stirred for 4 hours at 80° C. Thereafter, the hot slurry was quenched with cold (about 20° C.) demi-water, and filtered and washed thoroughly with demi-water. The filtrate was resuspended in 300 g demi-water and heated to 70° C. while being magnetically stirred. After reaching 70° C., 0.1 g $HNO_3$ (commercially available in 65% solution in water from Merck KGAA) was added per gram zeolite (total 1.54 g 65% $HNO_3$). After one hour at 70° C., the slurry was filtered and washed thoroughly with demi-water. The as-obtained zeolite is referred to with MZ6' or '780 mp'.

Modified Zeolite 7 (Comparative)

A portion of the 'MZ6' (760 mp) was dried at 120° C. and subsequently calcined at 760° C. for 1 hour under $N_2$ atmosphere and subsequently calcined under air at 550° C. for 2 hours. This calcined sample is referred to with 'MZ7' or '780 mp-C' and serves as a comparative material (prepared using a two-step calcination procedure similar to Example 7 of US2013/0292300A1).

Powder Analysis of (Modified) Zeolite Y

Prior to powder analysis, all samples were dried at 120° C., calcined at 760° C. for 1 hour under an $N_2$ atmosphere and subsequently calcined under air at 550° C. for 2 hours using the two-step calcination procedure, similar to Example 7 of US20130292300A1. This, to remove the surfactant and enable accessibility for sorption experiments.

The following tests/apparatus were used for the analysis:

Pore Volumes:

Total pore volume ('Total PV') and mesopore volume ('mesoPV') were determined by Argon physisorption.

To this end, sorption experiments were performed with argon (−186° C.) using a Micromeritics 3FLEX Version 4.03 apparatus. Prior to the adsorption experiments, the samples were outgassed for at least 12 hours under vacuum at 350° C.

For determining the 'Total PV' single-point Argon desorption data at P/P0=0.99 was used.

For determining the 'mesoPV' (in 2-8 nm range) Argon adsorption data was used, using the HS-2D-NLDFT, Cylindrical oxide, Ar, 87 model from Micromeritics. From this data also the average pore size in the 2-8 nm pore range was calculated.

Argon Surface Area:

The surface area was determined through Argon adsorption in accordance with the conventional BET (Brunauer-Emmett-Teller) method adsorption technique as described in the literature by S. Brunauer, P. Emmett and E. Teller, J. Am. Chm. Soc., 60, 309 (1938), and ASTM method D4365-95. Surface areas were determined at P/P0=0.03.

Unit Cell Parameter A0:

XRD analysis, e.g. in accordance with ASTM D3942-80, was used to determine the unit cell constant.

The samples were measured on an X'Pert diffractometer from Malvern Panalytical. The samples were measured in a powdered, homogenized form.

Samples and reference samples (i.e. the untreated parent zeolites) were kept inside a closed radiation cabinet of the diffractometer for at least 16 hours to ensure equal equilibration with the ambient conditions of the cabinet.

Crystallinity:

XRD analysis was used to determine crystallinity. The crystallinity was determined by comparing the total diffracted intensity of the diffraction pattern of a sample to that of a reference sample (the corresponding parent zeolite). The intensity ratio was reported as a percentage of the reference intensity.

Bulk (Molar) Silica to Alumina Ratio (SAR):

The bulk (molar) silica to alumina ratio (SAR) can be determined through various techniques such as ICP, AAS and XRF resulting in similar outcomes. Here, XRF analysis was applied using a 4 kW WD-XRF analyser.

The results are given in Table 2 below.

hours. The resulting material is referred to with 'MZ2-ASA 30% blend' (or '760 mp-30blend').

3. A portion of sample MZ2 (760 mp) as obtained above was re-slurried in demi-water (10 ml/g dry material) together with amorphous silica-alumina, in a 75% ASA and 25% zeolite mass ratio (dry weight based). The used ASA had a surface area of about 500 $m^2$/g, a pore volume of 1.03 ml/g, an apparent bulk density of 0.24 g/ml and comprised 45% silica and 55% alumina. After stirring at least 60 minutes, the slurry was filtered and dried at 80° C. for 2 hours. The resulting material is referred to with 'MZ2-ASA 25% blend' (or '760 mp-25blend').

4. A portion of sample MZ2 (760 mp) as obtained above was used to prepare a carrier material as described below for Example 5 under 'Preparation of carriers and hydrocracking catalysts'. A mix was made with MZ2 and ASA to arrive at 15% zeolite content in the carrier (dry basis). After adding the extrusion aids, followed by mixing and extrusion, the as-obtained extrudates were dried at 80° C. for 2 hours. The obtained extrudates are referred to as Example 5 (or 'MZ2-15% carrier').

Explosibility tests were performed at Dekra (DEKRA Process Safety, Princeton, USA). The Dust Explosibility Classification Tests were performed using the Vertical Tube Apparatus as described by Bartknecht (1989) and in accordance with ASTM E1226 (the standard test method for explosibility of dust clouds) and with ASTM E1515 (the standard test method for the minimum explosible concentration).

A summary of the explosibility test results is provided in Table 3 below. 'Not explosible' indicates that the powder is not explosible with a 5 kJ chemical igniter source, whilst 'Explosible' indicates the possibility of explosibility.

TABLE 2 overview of (modified) zeolite Y properties. 'Parent' means untreated commercial zeolite.

| Zeolite/Modified zeolite | CBV-720 (parent) | MZ1 (720mp) | CBV-760 (parent) | MZ2 (760mp) | MZ 4 (760mpSA) | CBV-780 (parent) | MZ6 (780mp) |
|---|---|---|---|---|---|---|---|
| Exposure time to NaOH [h] | — | 6 | — | 5 | 5 | — | 4 |
| CA/CTAC molar ratio | — | 0 | — | 0 | 0.4 | — | 0 |
| Total PV (by Ar desorption) [ml/g] | 0.48 | 0.60 | 0.48 | 0.76 | 0.77 | 0.51 | 0.73 |
| mesoPV [ml/g] | 0.03 | 0.40 | 0.01 | 0.62 | 0.45 | 0.04 | 0.58 |
| mesoPV/Total PV [%] | 7 | 66 | 3 | 82 | 59 | 8 | 79 |
| Argon surface area [$m^2$/g] | 751 | 778 | 723 | 816 | 699 | 750 | 812 |
| Average pore size in 2-8 nm pore range [nm] | 2.6 | 4.4 | 4.9 | 4.1 | 5.5 | 2.6 | 4.2 |
| A0 [Å], by XRD | 24.33 | 24.33 | 24.28 | 24.32 | 24.32 | 24.27 | 24.30 |
| Crystallinity (%) vs parent zeolite Y, by XRD | 100* | 67 | 100* | 33 | 42 | 100* | 46 |
| SAR (molar, by XRF) | 30 | 28 | 62 | 62 | 62 | 83 | 90 |

*per definition

Explosibility Testing

For an explosibility test and TGA-MS experiments, the following 4 samples were prepared (or obtained).

1. A portion of sample MZ2 (760 mp) as obtained above was subjected as is to explosibility testing (described hereinafter).

2. A portion of sample MZ2 (760 mp) as obtained above was re-slurried in demi-water (10 ml/g dry material) together with amorphous silica-alumina, in a 70% ASA and 30% zeolite mass ratio (dry weight based). The used ASA had a surface area of about 500 $m^2$/g, a pore volume of 1.03 ml/g, an apparent bulk density of 0.24 g/ml and comprised 45% silica and 55% alumina. After stirring at least 60 minutes, the slurry was filtered and dried at 80° C. for 2

TABLE 3

Explosibility test results

| Sample | description | Explosibility test outcome |
|---|---|---|
| 1 | MZ2 (760 mp) | Explosible |
| 2 | MZ2-ASA 30% blend | Explosible |
| 3 | MZ2-ASA 25% blend | Not explosible |
| 4 | MZ2-15% carrier | Not explosible |

From this Table 3 it can be seen that the as obtained powder (MZ2) as well as the blend of ASA with 30% modified zeolite is potentially explosible.

For the blend with a lower MZ2 content (25%), as well as the carrier with 15% MZ2 the 'Not Explosible' result shows that this material does not have explosible behaviour. This implies that it can be heat-treated safely at commercial scale. Please note in this respect that this does not rule out potential burning of the material as there is still a certain amount of organic material present.

TGA-MS experiments were carried out in dynamic mode with heating rate of 2° C./min up to 800° C. on a Netzsch STA 449 F3 Jupiter® (NETZSCH-Geratebbau GmbH (Selb), Germany). As a protective gas argon (5 bar utility) at 20 ml/min was used, and as a purge gas 20% oxygen in argon at 65 ml/min was used. The gases that evolved during the heating were monitored on-line with a mass spectrometer (QMS 403D Aeolos, NETZSCH-Geratebbau GmbH). The tests were run with 85 μl aluminium oxide crucibles, with reference crucibles kept empty.

Samples (about 30-40 mg powder) of the zeolites were weighed into the crucibles and placed on a DSC carrier.

The samples were heated to 800° C. at a rate of 2° C./minute. Both the samples MZ2 (760 mp), MZ2-ASA blend (760 mp-25% blend) and a hydrocracking catalyst carrier comprising 15 wt. % MZ2 (760 mp) (viz. Example 1, Table 4 hereafter) were analysed for comparison.

The results of these TGA MS measurements are provided in FIG. 1, showing:

- in the left column a comparison between MZ2 (bold line) and MZ2-ASA blend (dotted line); and
- in the right column a comparison between MZ2 (again the bold line) and hydrocracking catalyst carrier according to Example 5 (grey line), with from top to bottom:
- mass spectrometer data: m/z=44 signal, indicative for $CO_2$ formation, as function of temperature (in ° C.);
- mass spectrometer data: m/z=18 signal, indicative for $H_2O$ formation, as function of temperature (in ° C.);
- thermogravimetric analysis data: mass change as function of temperature (in ° C.); and
- the first-time derivative of the mass change (δm/δt) as function of temperature (in ° C.).

The mass spectrometer data clearly allow to monitor the $H_2O$ removal and surfactant decomposition steps as function of the temperature. The surfactant decomposition is visible in the formation of $CO_2$ and CO (data not included).

These steps also coincide with the mass change, observed for both the MZ2 powder, the MZ2-ASA blend and the catalyst carrier according to Example 5.

From the mass change as function of the temperature, it can be seen that surfactant decomposition in the MZ2-ASA blend and in the catalyst carrier proceeds at a slower pace than in the parent MZ2 sample. This lower decomposition rate (for MZ2-ASA blend and catalyst carrier) is also reflected in the lower negative values in the δm/δt plots.

Hence, the data in FIG. 1 is in line with the above explosibility tests, showing that blending in of a binder moderates the exothermic decomposition of surfactant in air, thereby eliminating the risk of a dust explosion upon calcination.

Preparation of Carriers and Hydrocracking Catalysts

Several hydrocracking catalysts were made. Firstly, a catalyst carrier (i.e. extruded and calcined extrudate comprising zeolite and ASA as binder) was prepared with commercially available zeolite or with one of the modified zeolites as prepared above, whilst using the amounts of zeolite and ASA as indicated in Table 4 below. The catalyst carriers were prepared in amounts of about 15 g. The ASA used had a surface area of 500 $m^2$/g, a pore volume of 1.03 ml/g, an apparent bulk density of 0.24 g/ml and comprised 45% silica and 55% alumina.

As peptizing agents and extrusion aids, 1 wt. % acetic acid (Merck KGAA), 1 wt. % nitric acid (Merck KgaA), 0.5 wt. % PVA (5% aq Mowiol® 18-88) and 1 wt. % methylcellulose (K15M, available from the Dow Chemical Company) were used to prepare the reference carriers for making catalysts with parent zeolite (see Reference Examples 1, 2, 3, 5 and 6 in Table 4).

For all carriers and catalysts with modified zeolites, both comparative and in line with the present invention, 2.24% nitric acid (Merck Kgaa), 0.5 wt. % PVA (5% aq Mowiol® 18-88) and 1 wt. % methylcellulose (K15M) was used.

After mixing the zeolites with the ASA, a shaped catalyst carrier was obtained by extrusion into trilobe shaped extrudate with a diameter of 1.6 mm. The obtained shaped catalyst carriers were calcined at 650° C. for 1 hour.

Subsequently, the hydrogenation components were added to the calcined catalyst carriers through aqueous incipient wetness impregnation of nickel carbonate (commercially available from Umicore (Belgium), ammonium metatungstate (commercially available from Sigma-Aldrich) and citric acid (VWR Chemicals). The citric acid and Ni were added in a 1:1 molar ratio, aiming for a loading of 4 wt. % Ni and 19 wt. % W. After drying at 120° C., the catalysts were calcined at 450° C. for 2 h.

In below Table 4, the catalysts made with parent (i.e. non-modified) zeolite are indicated as 'Reference Examples'; catalysts made with zeolites according to the present invention are indicated as 'Examples'; and catalysts made with zeolites in line with the two-step calcination procedures of US20130292300A1 are indicated as 'Comparative Examples'.

TABLE 4

| Catalysts | | | | | | |
|---|---|---|---|---|---|---|
| Carrier and catalyst preparation | (modified) zeolite Y used | Zeolite Y content (in catalyst carrier) [wt. %] | ASA content (in catalyst carrier) [wt. %] | Drying T [° C.] | Calcination T [° C.] | Impregnation |
| Ref. Ex. 1 | CBV-760 (parent) | 15 | 85 | 120 | 650 | 4 wt. % Ni/ 19 wt. % W |
| Ref. Ex. 2 | CBV-760 (parent) | 30 | 70 | 120 | 650 | 4 wt. % Ni/ 19 wt. % w |
| Example 1 | MZ2 (760mp) | 30 | 70 | 120 | 650 | 4 wt. % Ni/ 19 wt. % W |
| Comp. Ex. 1 | MZ3 (760mp-C) | 30 | 70 | 120 | 650 | 4 wt. % Ni/ 19 wt. % W |

TABLE 4-continued

| Catalysts | | | | | | |
|---|---|---|---|---|---|---|
| Carrier and catalyst preparation | (modified) zeolite Y used | Zeolite Y content (in catalyst carrier) [wt. %] | ASA content (in catalyst carrier) [wt. %] | Drying T [° C.] | Calcination T [° C.] | Impregnation |
| Example 2 | MZ4 (760mpSA) | 30 | 70 | 120 | 650 | 4 wt. % Ni/ 19 wt. % W |
| Comp. Ex. 2 | MZ5 (760mpSA-C) | 30 | 70 | 120 | 650 | 4 wt. % Ni/ 19 wt. % W |
| Ref. Ex. 3 | CBV-720 (parent) | 25 | 75 | 120 | 650 | 4 wt. % Ni/ 19 wt. % W |
| Ref. Ex. 4 | CBV-720 (parent) | 50 | 50 | 120 | 650 | 4 wt. % Ni/ 19 wt. % W |
| Example 3 | MZ1 (720mp) | 50 | 50 | 120 | 650 | 4 wt. % Ni/ 19 wt. % w |
| Ref. Ex. 5 | CBV-780 (parent) | 15 | 85 | 120 | 650 | 4 wt. % Ni/ 19 wt. % W |
| Ref. Ex. 6 | CBV-780 parent) | 5 | 95 | 120 | 650 | 4 wt. % Ni/ 19 wt. % w |
| Comp. Ex. 3 | MZ7 (780mp-C) | 15 | 85 | 120 | 650 | 4 wt. % Ni/ 19 wt. % W |
| Example 4 | MZ6 (780mp) | 10 | 90 | 120 | 650 | 4 wt. % Ni/ 19 wt. % W |
| Example 5 | MZ2 (760mp) | 15 | 85 | 80 | — | — |
| Example 6 | MZ2 (760mp) | 30 | 70 | 80 | — | — |

Catalytic Testing

The hydrocracking performance of the catalysts of the present invention was assessed in two types of tests.

Test 1

In Test 1, a second stage series-flow simulation was performed in which inventive and comparative catalysts were evaluated against reference catalysts. The testing was carried out in once-through nanoflow equipment which had been loaded with a top catalyst bed comprising 0.6 ml C-424 catalyst (commercially available from Shell Catalysts & Technologies (Ghent, Belgium)) diluted with 0.6 ml of Zirblast (B120; commercially available from Saint-Gobain ZirPro (France)) and a bottom catalyst bed comprising 0.6 ml of the test catalyst diluted with 0.6 ml Zirblast (B120). Both catalyst beds were pre-sulfided in situ prior to testing through gas phase sulfidation: pre-sulfiding was performed at 15 barg in gas phase (5 vol. % $H_2S$ in hydrogen), with a ramp of 20° C./h from room temperature (20° C.) to 135° C., and holding for 12 hours before raising the temperature to 280° C., and holding again for 12 hours before raising the temperature to 355° C. again at a rate of 20° C./h.

Each test involved the sequential contact of a hydrocarbonaceous feedstock (a heavy gas oil) with the top catalyst bed and then the bottom catalyst bed in a once-through operation under the following process conditions:

a space velocity of 1.5 kg heavy gas oil per liter catalyst per hour ($kg \cdot l^{-1} \cdot h^{-1}$);

a hydrogen gas/heavy gas oil ratio of 1440 Nl/kg;

a hydrogen sulphide partial pressure of $5.6 \times 10^5$ Pa (5.6 bar); and a total pressure of $14 \times 10^6$ Pa (140 bar).

The heavy gas oil used had the following properties:

Carbon content: 86.82 wt. %

Hydrogen content: 13.18 wt. %

Nitrogen (N) content: 28 ppmw

Added n-Decylamine: 12.3 g/kg (equivalent to 1100 ppmw N)

Total nitrogen (N) content: 1110 ppmw

Density (70° C.): 0.8586 g/ml

Mono-aromatic rings: 4.57 wt. %

Di+-aromatics rings: 1.83 wt. % Initial boiling point: 316° C.

50% w boiling point: 425° C.

Final boiling point: 600° C.

Fraction boiling below 370° C.: 8.75 wt. %

Fraction boiling above 540° C.: 4.18 wt. %

Hydrocracking performance was assessed at conversion levels between 40 and 90 wt. % net conversion of feed components boiling above 370° C. The experiments were carried out at different temperatures to obtain 65 wt. % net conversion of feed components boiling above 370° C. in all experiments by interpolation. Table 4 shows the results obtained for the catalysts as listed in Table 3.

Test 2

In Test 2, a second stage of a two-stage simulation was performed in which inventive and comparative catalysts were evaluated against reference catalysts. The testing was carried out in once-through nanoflow equipment which had been loaded with 0.6 ml of the test catalyst diluted with 0.6 ml Zirblast (B120). The catalysts were pre-sulfided as described for Test 1 above.

Each test involved contacting of a hydrocarbonaceous feedstock (a heavy gas oil) with the catalyst bed in a once-through operation under the following process conditions:

a space velocity of 1.5 kg heavy gas oil per liter catalyst per hour ($kg \cdot l^{-1} \cdot h^{-1}$);

a hydrogen gas/heavy gas oil ratio of 1500 Nl/kg; 50 ppmV $H_2S$ obtained by spiking the feed with Sulfrzol S54 (obtained from Lubrizol); and a total pressure of $14 \times 10^6$ Pa (140 bar).

The heavy gas oil used had the following properties:

Carbon content: 85.86 wt. %

Hydrogen content: 14.14 wt. %

Nitrogen (N) content: 0.3 ppmw

Added Sulfrzol (0.186 g/kg sulfrzol 54) to achieve 50 ppmV $H_2S$ in the gas phase
Density (70° C.): 0.812 g/ml
Mono-aromatic rings: 0.75 wt. %
Di+-aromatics rings: 0.68 wt. %
Initial boiling point: 297° C.
50% w boiling point: 429° C.
Final boiling point: 580° C.
Fraction boiling below 370° C.: 11.6 wt. %
Fraction boiling above 540° C.: 3.83 wt. %

Hydrocracking performance was assessed at conversion levels between 30 and 70 wt. % net conversion of feed components boiling above 370° C. The experiments were carried out at different temperatures to obtain 55 wt. % net conversion of feed components boiling above 370° C. in all experiments by interpolation. Table 5 below shows the results obtained for the catalysts as listed in Table 4.

(Comparative Examples 1-3) wherein two-step calcination took place (thereby removing at least part of the surfactant), as can be seen from the consistent higher Delta MD values.

Examples 1 and 2 (catalysts made with mesoporous zeolite CBV-760) showed improved tri+ aromatic saturation compared to Comparative Examples 1 and 2 (wherein two-step calcination took place).

The person skilled in the art will readily understand that many modifications may be made without departing from the scope of the invention.

We claim:

1. A method of preparing a supported hydrocracking catalyst, the method comprising the steps of:

a) providing a zeolite Y having a bulk silica to alumina ratio (SAR) of at least 10;

TABLE 5

| Hydrocracking performance | | | | | | | | | | | | | |
|---|---|---|---|---|---|---|---|---|---|---|---|---|---|
| | R. Ex. 1 | R. Ex. 2 | Ex. 1 | C .Ex. 1 | Ex. 2 | C. Ex. 2 | R. Ex. 3 | R. Ex. 4 | Ex. 3 | R. Ex. 5 | R. Ex. 6 | C. Ex. 3 | Ex. 4 |
| Parent zeolite (CBV~) | 760 | 760 | 760 | 760 | 760 | 760 | 720 | 720 | 720 | 780 | 780 | 780 | 780 |
| Test#[1] | 1 | 1 | 1 | 1 | 1 | 1 | 1 | 1 | 1 | 2 | 2 | 2 | 2 |
| T required for target conversion[1] [° C.] | 394 | 385 | 398 | 400 | 398 | 398 | 386 | 379 | 380 | 343 | 364 | 362 | 368 |
| C1-C4 [wt. %] | 3.5 | 3.8 | 3.5 | 3.7 | 3.5 | 3.6 | 3.9 | 4.3 | 3.9 | 3.8 | 2.9 | 3.3 | 4.0 |
| C5-82° C. [wt. %] | 3.4 | 6.3 | 5.0 | 5.1 | 4.9 | 5.1 | 6.6 | 7.0 | 6.2 | 8.7 | 6.2 | 6.5 | 6.6 |
| 82-150° C. [wt. %] | 21.3 | 23.6 | 20.0 | 19.5 | 19.5 | 19.3 | 23.2 | 26.0 | 24.3 | 31.9 | 27.8 | 26.3 | 24.2 |
| 150-370° C.[2] [wt. %] | 69.8 | 66.3 | 71.5 | 71.7 | 72.1 | 71.9 | 66.2 | 62.7 | 65.6 | 55.6 | 61.1 | 63.9 | 65.4 |
| Delta MD[3] | 0* | 0* | 0.6 | 0.4 | 1.2 | 1.0 | 0* | 0* | 2.5 | 0* | 0* | 1.3 | 1.5 |
| diesel/kero ratio[4] [wt. g/wt. %] | 0.96 | 0.87 | 1.08 | 1.12 | 1.07 | 1.11 | 0.88 | 0.77 | 0.81 | 1.15 | 0.98 | 1.21 | 1.23 |
| k-540/k-370[5] | 1.06 | 0.94 | 1.10 | 1.24 | 1.08 | 1.26 | 0.97 | 0.80 | 0.95 | 1.01 | 0.73 | 1.14 | 1.17 |
| HDA mono [wt. %] | 45 | 41 | 46 | 44 | 46 | 44 | — | — | — | 93 | 95 | 97 | 96 |
| HDA di [wt. %] | 83 | 85 | 86 | 84 | 86 | 84 | — | — | — | 97 | 99 | 99 | 99 |
| HDA tri+ [wt. %] | 70 | 71 | 87 | 76 | 88 | 72 | — | — | — | 84 | 90 | 91 | 90 |
| $H_2$ consumption [wt. %] | 1.38 | 1.44 | 1.35 | 1.34 | 1.35 | 1.34 | 1.45 | 1.49 | 1.47 | 0.93 | 0.86 | 0.92 | 0.88 |

[1]Hydrocracking test. Target net conversion for Test 1 is 65 wt. % and for Test 2 55 wt. %.
[2]Middle Distillate (MD) selectivity
[3]Delta MD versus reference curve
*per definition: a linear curve between the two reference data points for the catalysts made with CBV-720, CBV-760 or CBV-780 was used to calculate the delta MD for the comparative and inventive catalysts versus the reference
[4]250-370° C./150-250° C.
[5]ratio of rate of conversion (in kg/l/h) of >540° C. fraction vs >370° C. fraction The results in Table 5 show that:

Catalysts with a mesoporous zeolite (Examples 1 to 4 and Comparative Examples 1 and 2) give a higher middle distillate (MD) selectivity (150-370° C.) than the corresponding non-mesoporized catalysts (Reference Examples 1-4), as can be seen from the Delta MD values;

Catalysts with a mesoporous zeolite give a higher diesel/kero ratio than the non-mesoporized catalysts;

Catalysts prepared with a mesoporous zeolite with an enlarged mesopore diameter through the use of a swelling agent (viz. Example 2 and Comparative Example 2) show an increased MD selectivity over catalysts prepared with the same mesoporous zeolite (viz. MZ2) but without a swelling agent (Example 1 and Comparative Example 1). This is demonstrated by a significant increase in Delta MD.

The MD selectivity of Examples 1-2 (comprising modified CBV-720 or CBV-760) according to the present invention is higher when compared the corresponding examples b) mixing the zeolite Y provided in step a) with a base, water and a surfactant, thereby obtaining a slurry of the zeolite Y;

c) reducing the water content of the slurry obtained in step b) thereby obtaining solids with reduced water content, wherein the reducing of the water content in step c) involves the addition of a binder;

d) shaping the solids with reduced water content obtained in step c) thereby obtaining a shaped catalyst carrier;

e) calcining the shaped catalyst carrier obtained in step d) at a temperature above 300° C. in the presence of the surfactant of step b), thereby obtaining a calcined catalyst carrier;

f) impregnating the catalyst carrier calcined in step e) with a hydrogenation component thereby obtaining a supported catalyst;

wherein no heat treatment at a temperature of above 300° C. takes place between the mixing of step b) and the shaping of step d), wherein the calcining in step e) takes place in the presence of oxygen, and wherein the surfactant content at the time of shaping in step d) is at least 20 wt. % on dry-zeolite Y basis.

2. The method according to claim 1, wherein the zeolite Y provided in step a) has a bulk silica to alumina ratio (SAR) of 20 to 100.

3. The method according to claim 1, wherein the surfactant as used in step b) comprises an alkylammonium halide.

4. The method according to claim 1, wherein in step b) the zeolite Y is mixed with a $C_8$-$C_{20}$ alcohol.

5. The method according to claim 1, wherein the zeolite Y in the slurry as obtained in step b) has a total mesopore volume in pores with a volume of 2-8 nm as determined according to Ar adsorption according to NLDFT of at least 0.2 ml/g.

6. The method according to claim 1, wherein the hydrogenation component comprises a metal selected from the group consisting of Group VIB and Group VIII metals.

7. The method according to claim 6, wherein the metal is selected from Ni, W and Mo.

* * * * *